United States Patent [19]

Markofsky et al.

[11] 4,016,101
[45] Apr. 5, 1977

[54] PROCESS AND COMPOSITION FOR BREAKING EMULSIONS

[75] Inventors: Sheldon B. Markofsky, Olney; Louis L. Wood, Rockville, both of Md.

[73] Assignee: W. R. Grace & Co., New York, N.Y.

[22] Filed: Mar. 11, 1976

[21] Appl. No.: 665,748

Related U.S. Application Data

[62] Division of Ser. No. 423,503, Dec. 10, 1973, Pat. No. 3,993,615.

[52] U.S. Cl. .............................. 252/344; 252/358; 252/308
[51] Int. Cl.² ........................................ B01D 17/04
[58] Field of Search ................ 252/344, 358, 308; 260/29.2 TN, 77.5 CH, 77.5 Q, 32.8 N

[56] References Cited

UNITED STATES PATENTS

| | | | |
|---|---|---|---|
| 3,294,752 | 12/1966 | Wilkinson | 264/103 X |
| 3,462,470 | 8/1969 | Emery et al. | 260/77.5 CH X |
| 3,682,867 | 8/1972 | Shackelford et al. | 260/77.5 CH |
| 3,702,777 | 11/1972 | Watson et al. | 260/77.5 CH X |
| 3,892,696 | 7/1975 | Wood | 260/77.5 CH X |

FOREIGN PATENTS OR APPLICATIONS 880,485  6/1953  Germany

*Primary Examiner*—Benjamin R. Padgett
*Assistant Examiner*—E. Suzanne Parr
*Attorney, Agent, or Firm*—Elton Fisher

[57] ABSTRACT

A process for breaking an oil-in-water or a water-in-oil emulsion comprising treating the emulsion with a demulsifier prepared by; (a) forming a water soluble polyurea by reacting a polyisocyanate and a polyamine in a non-protonic liquid carbonyl solvent; and (b) forming the demulsifier by reacting the water soluble polymer with an alkylating agent.

24 Claims, No Drawings

PROCESS AND COMPOSITION FOR BREAKING EMULSIONS

This is a division, of application Ser. No. 423,503, filed Dec. 10, 1973, now U.S. Pat. No. 3,993,615.

BACKGROUND OF THE INVENTION

This invention is in the field of emulsions. More particularly it is in the field of oil-in-water and water-in-oil emulsions. Even more particularly said invention is directed to a process for breaking (demulsifying) such emulsions.

The following U.S. Pat. Nos. teach methods for demulsifying emulsions comprising oil and water:
3,166,516 (Kirkpatrick et al., 252/344)
3,205,169 (Kirkpatrick et al., 252/8.55)
3,272,757 (Kirkpatrick et al., 252/344)
3,528,928 (Rushton 252/341)
3,557,017 (Mange et al. 252/339)
3,617,571 (Mange et al., 210/54)
3,640,894 (Sampson 252/344)

SUMMARY OF THE INVENTION

In summary this invention is directed to a water soluble quaternary ammonium polymer which is useful as a demulsifying agent for demulsifying a water-in-oil or an oil-in-water emulsion. Said water soluble quaternary ammonium polymer is prepared by a process comprising:
 a. preparing a water soluble polyurea having at least 1 amino group per molecule by admixing and reacting in a liquid non-protonic carbonyl solvent having at least 2 carbon atoms per molecule; (i) a polyisocyanate; and (ii) a polyamine having at least 3 amino nitrogen atoms per molecule with at least 2 of the amino nitrogens being bonded to hydrogen atoms; and
 b. forming the water soluble quaternary ammonium polymer by reacting said water soluble polyurea with an alkylating agent.

DESCRIPTION OF PREFERRED EMBODIMENTS

In preferred embodiments of our invention recited in the above Summary:
 1. The non-protonic liquid carbonyl solvent is an aldehyde or a ketone (preferably a ketone and more preferably acetone).
 2. The polyamine and the non-protonic liquid carbonyl solvent are admixed and allowed to stand for 2 minutes to 24 hours at −5° C to +150° C before the polyamine and the polyisocyanate are admixed.
 3. The polyisocyanate and the polyamine are admixed in amounts to provide 1–20 amine groups per isocyanate group.
 4. The polyamine and the polyisocyanate are reacted at 0°–100° C (or 5°–70° C).
 5. The alkylating agent is an alkyl sulfate having 2–10 carbon atoms (preferably dimethyl sulfate or diethyl sulfate).
 6. The water soluble polyurea and the alkylating agent are reacted in an aqueous medium.
 7. The water soluble polyurea is separated from the non-protonic liquid carbonyl solvent before reacting said water soluble polyurea with the alkylating agent to form the water soluble quaternary ammonium polymer.
 8. The polyamine and the non-protonic carbonyl solvent are combined and admixed before the polyisocyanate is admixed therewith.
 9. The polyamine and the non-protonic carbonyl solvent are combined and admixed in a mole ratio of 1:1–100 to form a first mixture; the polyisocyanate and the non-protonic carbonyl solvent are combined and admixed in a mole ratio of 1:10–1,000 to form a second mixture; and the first mixture and the second mixture are combined.
 10. The polyisocyanate is a polyisocyanate prepared by reacting a polyethylene glycol having a molecular weight of 200–6,000 (preferably 600–2,000 and more preferably about 1,000) and tolyene diisocyanate, the mole ratio of polyethylene glycol to tolyene diisocyanate being 1:0.8–1.2.

In another preferred embodiment ("Embodiment A") this invention is directed to a process for preparing a water soluble quaternary ammonium polymer comprising:
 a. preparing a water soluble polyurea having at least 1 amino group per molecule by admixing and reacting in a liquid non-protonic carbonyl solvent having at least 2 carbon atoms per molecule; (i) a polyisocyanate; and (ii) a polyamine having at least 3 amino nitrogen atoms per molecule with at least 2 of the amino nitrogens being bonded to hydrogen atoms; and
 b. forming the water soluble quaternary ammonium polymer by reacting said water soluble polyurea with an alkylating agent.

In especially preferred embodiments of our invention as recited in the above Embodiment A, supra:
 1. The non-protonic liquid carbonyl solvent is an aldehyde or a ketone (preferably a ketone and more preferably acetone).
 2. The polyamine and the non-protonic liquid carbonyl solvent are admixed and allowed to stand for 2 minutes to 24 hours at −5° C to +150° C before the polyamine and the polyisocyanate are admixed.
 3. The polyisocyanate and the polyamine are admixed in amounts to provide 1–20 amine groups per isocyanate group.
 4. The polyamine and the polyisocyanate are reacted at 0°–100° C (or 5°–70° C).
 5. The alkylating agent is an alkyl sulfate having 2–10 carbon atoms (preferably dimethyl sulfate or diethyl sulfate).
 6. The water soluble polyurea and the alkylating agent are reacted in an aqueous medium.
 7. The water soluble polyurea is separated from the non-protonic liquid carbonyl solvent before reacting said water soluble polyurea with the alkylating agent to form the water soluble quaternary ammonium polymer.
 8. The polyamine and the non-protonic carbonyl solvent are combined and admixed before the polyisocyanate is admixed therewith.
 9. The polyamine and the non-protonic carbonyl solvent are combined and admixed in a mole ratio of 1:1–100 to form a first mixture; the polyisocyanate and the non-protonic carbonyl solvent are combined and admixed in a mole ratio of 1:10–1,000 to form a second mixture; and the first mixture and the second mixture are combined.
 10. The polyisocyanate is a polyisocyanate prepared by reacting a polyethylene glycol having a molecular weight of 200–6,000 (preferably 600–2,000 and more preferably about 1,000) and tolyene diisocyanate, the mole ratio of polyethylene glycol to tolyene diisocyanate being 1:0.8–1.2.

In another preferred embodiment ("Embodiment B") this invention is directed to a process for breaking (demulsifying) an aqueous emulsion comprising a water-in-oil emulsion or an oil-in-water emulsion, said process comprising subjecting the emulsion to the demulsifying action of a demulsifying composition formed by; a process comprising; (a) preparing a water soluble polyurea having at least 1 amino group per molecule by admixing and reacting in a liquid non-protonic carbonyl solvent having at least 2 carbon atoms per molecule; (i) a polyisocyanate; and (ii) a polyamine having at least 3 amino nitrogen atoms per molecule with at least 2 of the amino nitrogens being bonded to hydrogen atoms; and (b) forming the water soluble quaternary ammonium polymer by reacting said water soluble polyurea with an alkylating agent, and separating the resulting oil and water phases of the broken aqueous emulsion, the demulsifying composition being present in an amount effective for breaking the aqueous emulsion.

In especially preferred embodiments of our invention as recited in Embodiment B, supra:

1. The non-protonic liquid carbonyl solvent is an aldehyde or a ketone (preferably a ketone and more preferably acetone or methyl ethyl ketone).
2. The polyamine and the non-protonic liquid carbonyl solvent are admixed and allowed to stand for 2 minutes to 24 hours at −5° C to +150° C before the polyamine and the polyisocyanate are admixed.
3. The polyisocyanate and the polyamine are admixed in amounts to provide 1–20 amine groups per isocyanate group.
4. The polyamine and the polyisocyanate are reacted at 0°–100° C (or 5°–70° C).
5. The alkylating agent is an alkyl sulfate having 2–10 carbon atoms (preferably dimethyl sulfate or diethyl sulfate).
6. The water soluble polyurea and the alkylating agent are reacted in an aqueous medium.
7. The water soluble polyurea is separated from the non-protonic liquid carbonyl solvent before reacting said water soluble polyurea with the alkylating agent to form the water soluble quaternary ammonium polymer.
8. The polyamine and the non-protonic carbonyl solvent are combined and admixed before the polyisocyanate is admixed therewith.
9. The polyamine and the non-protonic carbonyl solvent are combined and admixed in a mole ratio of 1:1–100 to form a first mixture; the polyisocyanate and the non-protonic carbonyl solvent are combined and admixed in a mole ratio of 1:10–1,000 to form a second mixture; and the first mixture and the second mixture are combined.
10. The polyisocyanate is a polyisocyanate prepared by reacting a polyethylene glycol having a molecular weight of 200–6,000 (preferably 600–2,000 and more preferably about 1,000) and tolylene diisocyanate, the mole ratio of polyethylene glycol to tolylene diisocyanate being 1:0.8–1.2.
11. The aqueous emulsion is a water-in-oil emulsion.
12. The aqueous emulsion is an oil-in-water emulsion.
13. The oil component of the emulsion is a petroleum oil.
14. The petroleum oil is crude oil.
15. The aqueous component of the emulsion is a brine (including a naturally occurring brine).

DETAILED DESCRIPTION OF THE INVENTION

This invention is directed to a process for breaking water-in-oil emulsions--especially water-in-mineral oil emulsions including petroleum emulsions commonly encountered in the production, handling, and refining crude mineral oil (petroleum).

This invention is also directed to a process for breaking oil-in-water emulsions including mineral oil-in-water emulsions such as petroleum emulsions commonly encountered in the production, handling, and refining crude mineral oil.

This invention is also directed to breaking oil-in-water and water-in-oil type emulsions which are produced artificially or naturally.

This invention is also directed to a composition (a water soluble quaternary ammonium polymer) useful for breaking such emulsions and to a process for preparing said composition.

The presence of such emulsion often present problems of resolution, recovery, or disposal.

Petroleum emulsions are frequently of the water-in-oil type wherein the oil acts as a continuous phase for the dispersal of finely-divided particles of naturally occurring water or brines. These emulsions are often extremely stable and will not resolve (break or separate) on long standing.

Water-in-oil type emulsions frequently occur artificially resulting from any one or more of numerous operations encountered in various industries. The emulsions obtained from producing wells and from the bottom of crude oil storage tanks are commonly referred to as "cut oil", "emulsified oil", bottom settlings", and "B. S.".

In the process of this invention an aqueous emulsion (oil-in-water type or water-in-oil type) is admixed with an aqueous solution of a demulsifying composition (a water soluble quaternary polymer of the type recited in the above Summary and the embodiments thereunder) and the resulting oil and water phases of the broken emulsion are separated.

The demulsifying composition of this invention is a water soluble quaternary ammonium polymer prepared by reacting a polyamine and polyisocyanate in a non-protonic liquid carbonyl compound (a non-protonic carbonyl containing solvent) to form a water soluble intermediate polymer and alkylating the water soluble intermediate polymer with an alkylating agent to form the demulsifying composition (the water soluble quaternary ammonium polymer) of this invention.

It is important in the preparation of the demulsifying composition of this invention that the reaction between the polyamine and the polyisocyanate be conducted in a liquid non-protonic carbonyl containing solvent — e.g., a ketone or aldehyde. If said reaction is conducted in a protonic solvent or in the absence of the non-protonic carbonyl containing solvent, the final product is a quaternary ammonium polymer which is not water soluble and which is not adapted for use as a demulsifying composition or compound.

Where preparing the demulsifying composition of this invention, we generally prefer to combine and admix the non-protonic carbonyl containing solvent and the polyamine and maintain the resulting first mixture at −5° C to 150° C for about 2 minutes to 24 hours or longer and then adjust the temperature (if temperature adjustment is required) of said first mixture to 0°–25° C and admixing the first mixture (at 0°–25° C) and a second mixture (also at 0°–25° C) prepared by admixing a polyisocyanate and another portion of said non-protonic carbonyl containing solvent.

Generally the mole ratio of isocyanate groups to primary and/or secondary amine groups is 1:1–20, and it is preferred that there be an excess of amine groups over isocyanate groups so that the water soluble intermediate polymer described in the above Summary and the embodiments thereunder will contain free (unreacted) primary and/or secondary amino groups.

The reaction mixture (prepared by admixing the above-described first mixture and the above described second mixture) is maintained at −5° to +150° C (or 0°–100° C) for about 2 minutes to 8 hours while agitating it (the reaction mixture) to form the water soluble intermediate polymer described in said Summary and the embodiments thereunder.

Typical of the polyisocyanates (including fully equivalent polyisocyanates) which have been used with excellent results to prepare the demulsifying agent of this invention are those recited in the examples, infra, and PAPI-1 (a polyaryl polyisocyanate defined in U.S. Pat. No. 2,683,730), tolylene diisocyanate, triphenylmethane-4,4'4''-triisocyanate, benzene-1,3,5-triisocyanate, toluene-2,4,6-triisocyante, diphenyl-2,4,4'-triisocyanate, hexamethylene diisocyanate, xylylene diisocyanate, chlorophenylene diisocyanate, diphenylmethane-4,4'diisocyanate, naphthalene-1,5-diisocyanate, xylene-alpha, alpha'-diisothiocyanate, 3,3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylenebis(phenyl isocyanate), 4,4'-sulfonylbis-(phenyl isocyanate), 4,4'-methylene di-ortho-tolylisocyanate, ethylene diisocyanate, ethylene diisothiocyanate, trimethylene diisocyanate, the diisocyanates described or listed in the above Preferred Embodiments, and the like. Mixtures of any one or more of the above mentioned organic isothiocyanates or isocyanates can be used as desired. The aromatic diisocyanates and polyisocyanates or mixtures thereof which are especially suitable are those which are readily commercially available, have a high degree of reactivity and a relatively low cost.

As used herein, the term "polyisocyanate" is used to include diisocyanates, diisothiocyantes, and polyisothiocyanates.

Polyamines which are useful for preparing the demulsifying agent (water soluble quaternary ammonium polymer) of this invention are polyamines having at least 3 amino groups per molecule with at least 2 of the amino nitrogens being bonded to hydrogen atoms. These amino groups can be attached to aromatic or aliphatic groups or to both an aromatic and an aliphatic group. Typically, these polyamines have from 3 to about 23 amino groups per molecule. Such polyamines include but are not limited to materials such as diethylenetriamine, triethylene-tetramine, tetraethylenepentamine, polyethyleneimine, tolylene-2,4,6-triamine, dipropylenetriamine, N-(2-aminoethyl)-1,3-propanediamine, N,N'-bis(3-aminopropyl)-piperazine, 3-(di-n-butylamino)-propylamine, diethylenetriamine, tetraethylenepentamine, triethylenetetramine, 1-(2-aminoethyl) piperazine, 3,3'-diaminodipropylamine, N,N'-bis[3-(2-aminoethylamino) propyl]ethylenediamine, N,N'-bis(2-aminoethyl)1,3-propanediamine, and N,N'-bis(3-aminopropyl)1,3-propanediamine.

The following amines listed in TABLE 1 are also useful for preparing the demulsifying agent of this invention:

TABLE 1

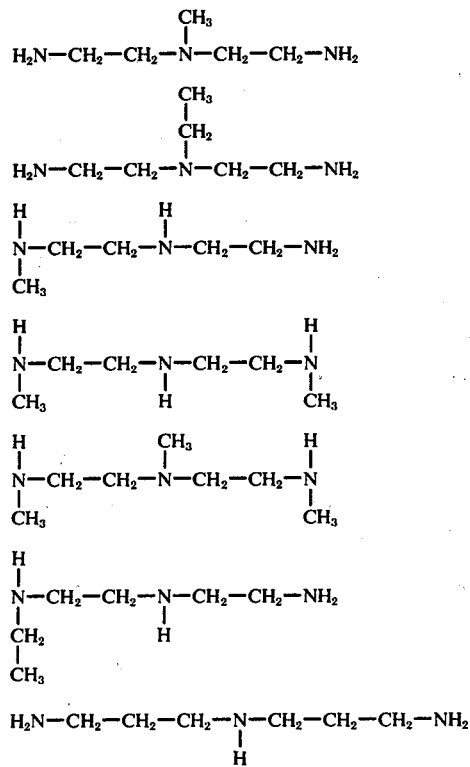

TABLE 1-continued
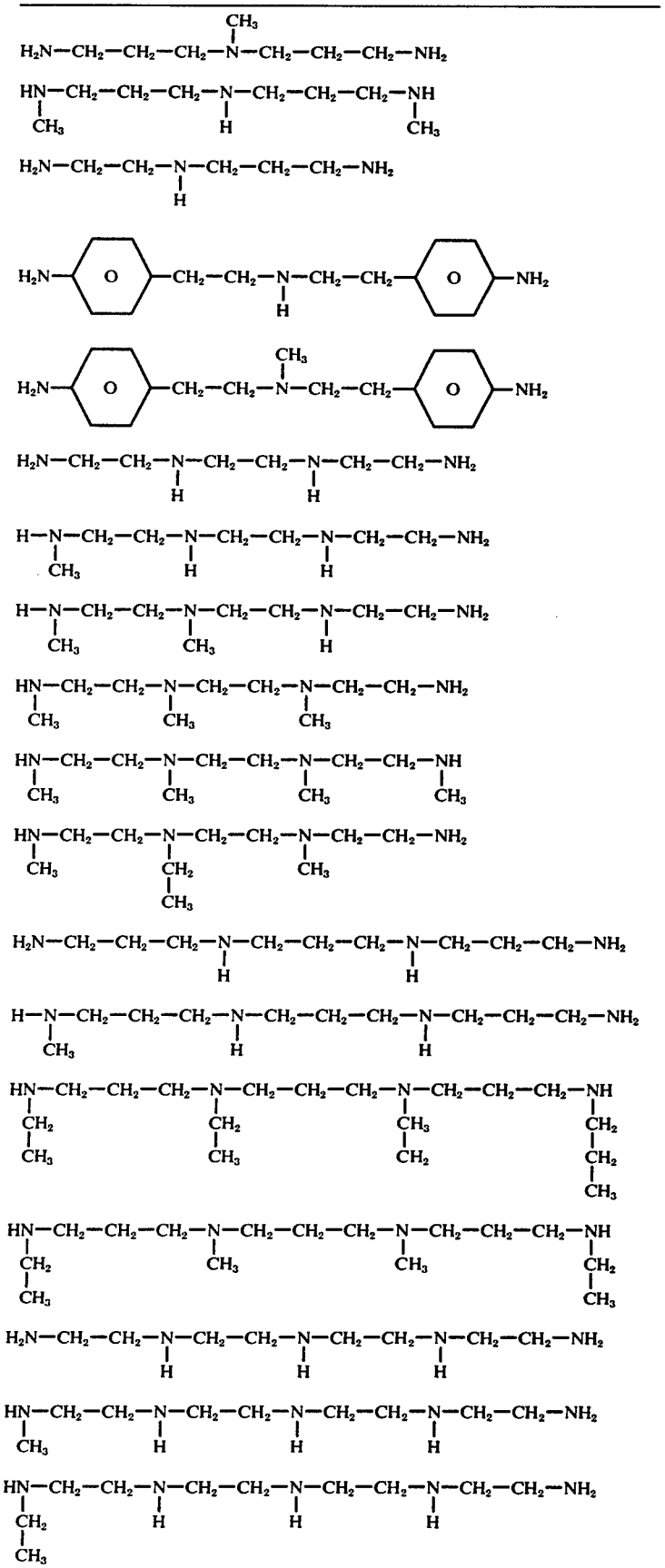

TABLE 1-continued

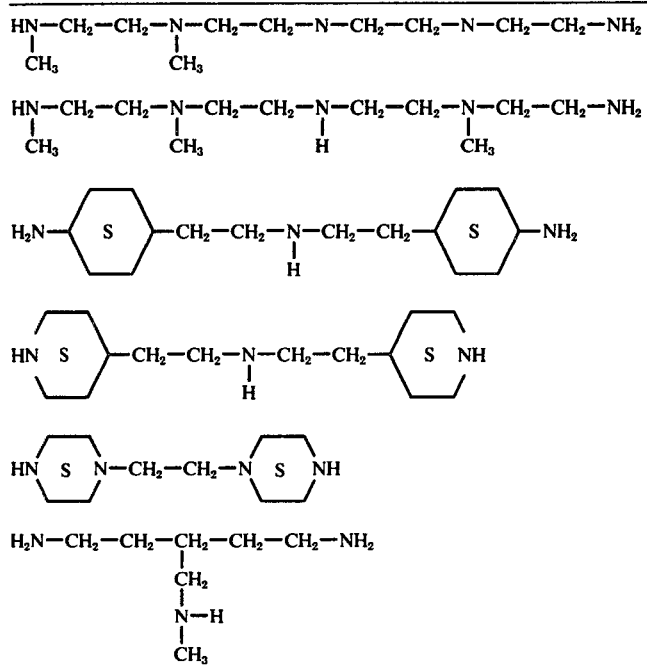

While substantially any non-protonic carbonyl compound having at least 2 carbon atoms which is liquid under the conditions used to admix and react the polyamine and polyisocyanate (to form the water soluble intermediate polymer - the water soluble polyurea) can be used in the process of this invention, we generally prefer to use acetone, methyl ethyl ketone, diethyl ketone, cyclohexanone, a methyl propyl ketone, an ethyl propyl ketone, a dipropyl ketone, acetaldehyde, propionaldehyde, butyraldehyde, isobutyraldehyde, or the like.

Where preparing the demulsifier (demulsifying agent) of this invention from the intermediate water soluble polyurea (water soluble intermediate polymer) by reacting said intermediate polyurea with an alkylating agent to produce the demulsifying agent (water soluble quaternary ammonium polymer) of this invention, it is generally preferred to separate the intermediate polymer from the non-protonic carbonyl containing solvent in which the polurea was prepared before reacting said polyurea with the alkylating agent. However, excellent results have been obtained where the non-protonic carbonyl containing solvent was not removed before alkylating the polyurea to form the demulsifying agent.

While we generally prefer to conduct the alkylation in an aqueous medium, water can be replaced in whole or in part by an equivalent solvent such as a lower alcohol, an ether of a lower alcohol (or a mixed ether of two lower alcohols), dimethyl sulfoxide, tetrahydrofuran, and the like. Excellent results are obtained where conducting the alkylation in such solvents or in mixtures thereof including mixtures thereof with water.

While any alkylating agent capable of alkylating an amino nitrogen to yield a quaternary ammonium group can be used to produce the demulsifying agent of this invention, preferred alkylating agents include alkyl sulfates having 2 to about 10 carbon atoms per molecule, alkyl halides (including but not limited to methyl chloride, methyl bromide, methyl iodide, ethyl chloride, ethyl bromide, propyl chloride, propyl bromide and the like), propylene oxide, ethylene oxide, aziridine, and diazomethane.

The instant invention will be better understood by referring to the following specific but nonlimiting examples. It is understood that said invention is not limited by said examples which are offered merely as illustrations; it is also understood that modifications can be made without departing from the spirit and scope of the invention.

EXAMPLE 1

1,000 grams of a polyethylene glycol having a weight average molecular weight of 1,000 was outgassed by stirring at 110° C for about 3-5 hours. The remaining glycol having a weight of about 980 grams was cooled to 50° C and then added as a liquid over a period of 15-20 minutes under an inert nitrogen atmosphere to 326 grams of tolylene diisocyanate. The tolylene diisocyanate had 80% by weight of the 2,4 isomer and 20% by weight of the 2,6 isomer. The reaction temperature was maintained between 50° C and 60° C and the reacting mixture was stirred for about 4 hours. The resulting product, an isocyanate capped polyethylene glycol (a diurethan having two terminal isocyanate groups), was designated "Product A".

EXAMPLE 2

A solution of 103 g of diethylenetriamine in 500 ml dry acetone was stirred at 60°-65° C under a dry nitrogen atmosphere for 2 hours. The resultant solution was cooled to 5° C and 980 grams of Product A (the isocyanate capped polyethylene glycol prepared in Example 1) in 1,000 ml of dry acetone at 50° C was added while stirring the resulting mixture. The resultant clear, pale yellow solution was cooled to 10°-15° C and stirred for 2 hours. The product solution was warmed to 60°-70° C, and approximately three-fourths of the acetone (about 1,100 ml) was removed by distilling the solution. To keep the product fluid, 1,000 ml of water was added and most of the remaining acetone (about 300–400 ml) was distilled at a temperature below 80° C. The remaining yellow syrup (a water soluble polyurea intermediate product) was diluted to a solid content of 17% by adding water thereto. The thus diluted syrup was designated "Product B".

EXAMPLE 3

A 300 g portion of Product B (from Example 2) having a solid content of 51 g and containing 0.05 equivalent of amino nitrogen and 14.4 g (0.114 mole) of dimethyl sulfate were admixed and maintained at 70° C for an hour. The pH the mixture formed by admixing Product B and the dimethyl sulfate was adjusted to 8 with aqueous sodium hydroxide solution (ca. 10% NaOH). After adjusting the pH, the mixture was maintained at 70° C for an additional 3 hour period. The reaction product, an aqueous solution of the demulsifier (the water soluble quaternary ammonium polymer) of our invention, was designated "Product C".

EXAMPLE 4

A triisocyanate was prepared by admixing and reacting 110 g of a water soluble triol having a weight average molecular weight of about 3,300, and a 2:1 ratio of ethylene oxide to propylene oxide and 17.4 g of the tolylene diisocyanate used in Example 2. The reaction mixture was stirred at 50°–60° C for 4 hours whereupon a clear, colorless syrup identified as a triisocyanate was recovered. This product which remained fluid at 25° C was designated "Product D".

EXAMPLE 5

A first solution was prepared by admixing 3.4 g of diethylenetriamine and 50 ml of acetone. The first solution was stirred for 2 hours while maintaining its temperature at 50°–60° C. The first solution was then cooled to 5° C.

A second solution was prepared by admixing 42.4 g of Product D from Example 4 and 50 ml of acetone. The second solution was cooled to 10° C.

A third solution (a reaction mixture) was prepared by admixing the first and second solutions. The third solution was agitated for an hour while maintaining its temperature at 5°–15° C. The third solution was then brought to 25° C and maintained at 25° C while being agitated for a half hour. A portion (ca. 75 ml) of acetone was vaporized therefrom at 50° C and 150 ml of water was added thereto. The product, an aqueous solution (having a pH of 9.5) of a water soluble intermediate polymer (a water soluble polyurea) was designated "Product E".

EXAMPLE 6

A demulsifying agent of our invention was prepared by alkylating Product E (from Example 5) according to the general procedure of Example 3, supra. The product, a water soluble quaternary ammonium polymer was designated "Product F".

EXAMPLE 7

The general procedure of Example 1 was repeated. However, in this instance the polyethylene glycol was replaced with 1,000 g of a dry polypropylene glycol having a weight average molecular weight of 1,025. The resulting product, an isocyanate capped polypropylene glycol, was designated "Product G".

EXAMPLE 8

The general procedure of Example 2 was repeated. However, in this instance the procedure was modified by; (a) replacing the polyisocyanate (Product A) which was used in Example 2 with Product G (the polyisocyanate prepared in Example 7); and (b) by dissolving Product G and the diethylenetriamine in methyl ethyl ketone rather than in acetone. The resulting product, an aqueous solution of a water soluble polyurea, was designated "Product H".

EXAMPLE 9

The general procedure of Example 3 was repeated. However, in this instance the procedure was modified by replacing the water soluble polyurea used in Example 3 with Product H (the water soluble polyurea prepared in Example 8). The resulting demulsifying agent (an aqueous solution of a water soluble quaternary ammonium polymer) was designated "Product I".

EXAMPLE 10

The general procedure of Example 2 was repeated. However, in this instance the polyisocyanate (Product A from Example 1) used in Example 2 was replaced with an equal molar amount of hexamethylene diisocyanate in acetone. The product, an aqueous solution of a water soluble polyurea, was designated "Product J".

EXAMPLE 11

The general procedure of Example 3 was repeated. However, in this instance the water soluble polyurea reactant (Product B from Example 2) was replaced with Product J from Example 10, supra. The reaction product an aqueous solution of the demulsifier (a water soluble quaternary ammonium polymer) of our invention was designted "Product K".

EXAMPLE 12

1,025 grams (1 mole) of dry polypropylene glycol having a weight average molecular weight of 1,025 was combined with 560 grams (2 moles) of dicyclohexyl-4,4'-diisocyanate. The resulting mixture was stirred at 60° C–70° C for six hours whereupon the isocyanate content of the reaction product had a constant value of 1.23 meg NCO/gram compared to a theoretical value of 1.26 meq per g. Said product was designated "Product L".

EXAMPLE 13

A solution of 14.6 grams (0.1 mole) triethylene tetramine in 50 grams methyl ethyl ketone was stirred at 25° C for 16 hours. To the resultant solution at 15° C was added with good stirring over a period of 20 minutes a solution of 119 grams (0.075 mole) of Product L (the above described diisocyanate) in 150 grams of methyl ethyl ketone. The reaction was stirred at 70° C for 45 minutes. Then 180 g of methyl ethyl ketone was distilled at 80°–50° C at 760 to 10 Torr. A yellow product syrup resulted which was diluted with 120 grams of water to make a 50 percent solids solution having 1.02 meq of amine per g compared to a theoretical value of 0.94 meq of amine per g. Said diluted syrup (an aqueous solution of a water solution polyurea) was designated "Product M".

EXAMPLE 14

The general procedure of Example 3 was repeated. However, in this instance the procedure was modified by replacing Product B (the polurea from Example 2) with a portion of Product M (the polyurea prepared in Example 13) containing 0.05 equivalent of amino nitrogen. The resulting demulsifier (an aqueous solution of a water soluble quaternary ammonium polymer) was designated "Product N".

In other runs demulsifiers of excellent quality were prepared by replacing the dimethyl sulfate with diethyl sulfate, dipropyl sulfate, methyl chloride, ethyl bromide, methyl iodide, diazomethane, propylene oxide, ethylene oxide, and azirdine.

EXAMPLE 15

Ten batches of water-in-oil emulsion were prepared by admixing, in each instance, 150 g of a non-detergent motor oil (Zayer's Premium Motor Oil SB-MM) with 15 g of water in a Waring Blender set on its highest mixing speed. Mixing time was 1 minute. The ten batches of emulsion were combined and admixed to prepare a composite which was designated "Emulsion 15". Each batch was prepared at ca. 25° C.

EXAMPLE 16

Test No. 1

Each of six 25 ml graduated cylinders (the "glass stopper type") was filled to the 25 ml mark with Emulsion 15.

The first cylinder was set aside as a control while the emulsion in each of the other graduated cylinders was treated with a predetermined quantity of a demulsifying agent - in this instance Product C prepared in Example 3. The demulsifying agent was added as an aqueous solution which contained $5 \times 10^{-2}$ g (0.05 g) of demulsifier (demulsifying agent) on a dry (water free) basis per ml. To keep all tests comperable, sufficient extra water was added to each graduated cylinder so that the total volume of added material (demulsifier solution plus extra water) was 0.5 ml. Obviously no extra water was required in Run No. 6, and 0.5 ml of extra water was required in the control (Run No. 1). All runs were made at 25° C.

Test No. 2

The runs of this test, which were made at the same time as those of Test No. 2 (described supra), were made to compare the demulsifying agent (demulsifier) with a commercially available demulsifying agent (Enjay's Breakit 8043). The procedure used in Test No. 2 was the general procedure of Test No. 1 except that the aqueous solution of Product C was replaced with an aqueous system prepared by diluting Enjay's Breakit 8043 with water so that said aqueous sytem contained $5 \times 10^{-2}$ g of Breakit 8043 on a dry basis per ml.

Table 2 shows the results obtained in each run of Test No. 1 and Table 3 shows the results obtained in each run of Test No. 2.

TABLE 2

Test No. 1
Demulsifying Agent: "Product C"

| Run No. | Ppm of Demulsifying Agent | Volume of Separated Aqueous Phase, ml | Appearance of Separated Aqueous Phase | Volume of Aqueous Emulsion* |
|---|---|---|---|---|
| 1 | 1,000 | 2.0 | Clear | 0.6 |
| 2 | 800 | 2.4 | Clear | 0.5 |
| 3 | 600 | 2.1 | Clear | 1.0 |
| 4 | 400 | 2.3 | Clear | 0.5 |
| 5 | 200 | 2.3 | Clear | 0.5 |
| 6 | None (Control) | 0 | Very Hazy | 2.8 |

*The aqueous emulsion is the foam phase between the bottom water phase and the upper oil phase.

TABLE 3

Test No. 2
Demulsifying Agent: Enjay's "Breakit 8043"

| Run No. | Ppm of Demulsifying Agent | Volume of Separated Aqueous Phase, ml | Appearance of Separated Aqueous Phase | Volume of Aqueous Emulsion* |
|---|---|---|---|---|
| 1 | 1,000 | 1.5 | Very Hazy | 1.3 |
| 2 | 800 | 1.7 | Clear | 0.8 |
| 3 | 600 | 1.5 | Very Hazy | 1.2 |
| 4 | 400 | 0.3 | Clear | 2.0 |
| 5 | 200 | 0.4 | Hazy | 2.0 |
| 6 | 0 | 0 | Very Hazy | 2.8 |

*The aqueous emulsion is the foam phase between the bottom water phase and the upper oil phase.

In other runs the general procedure of Test No. 1 of this example (Example 16) was repeated. However, said procedure was modified by using, in respective runs, Product F, Product I. Product K, and Product N as demulsifying agents. In each run the result was indistinguishable from that obtained in the corresponding run of Test No. 1 of this example (Example 16).

EXAMPLE 17

An oil-in-water emulsion was prepared by admixing 25 g the above mentioned non-detergent motor oil with 200 g of water in a Waring Blender set at its highest mixing speed. Mixing time was 15 minutes. The resulting product was placed in a separatory funnel, allowed to stand for 8 hours with occasional gentle swirling to facilitate separation of large oil particles. About 3/4 of the lower phase, a very hazy appearing emulsion of oil-in-water was removed from the funnel and recovered. Ten batches of the emulsion were prepared, combined, and designated "Emulsion 17".

EXAMPLE 18

The general procedure of Test No. 1 of Example 16 was repeated. However, in the 6 runs of this example (Example 18) Emulsion 15 was replaced with Emulsion 17. In each run (except Run No. 6, the control in which no demulsifier was added) the oil-in-water emulsion broke within 3 hours and it (the emulsion) separated into two phases; (a) a clear (haze free) aqueous phase; and (b) a film of oil floating on top of the haze free aqueous phase.

In other runs the general procedure of Example 18 was repeated. However, said procedure was modified by using in respective runs Product F, Product I, Product K, and Product N as demulsifying agents. In each run the result was indistinguishable from that obtained in the corresponding run of Test No. 1 of Example 18.

EXAMPLE 19

In another run an emulsion comprising a salt brine dispersed in crude oil (naturally occurring petroleum) was treated at 65°–70° C with 600 ppm of Product C using the general procedure of Run No. 3 of Test No. 1 of Example 16. The emulsion broke and in 10 hours a clear haze free aqueous phase had separated.

Similar results were using 1,000, 800, 400, and 200 ppm of said Product C.

Similar results were also obtained where Product C was replaced with Products, F, I, K, and N.

The emulsion did not break in a control run in which 0.5 ml of water (with no demulsifying agent therein) was used in place of the aqueous solution of demulsifying agent.

As used herein the term "mole" has its generally accepted meaning—a mole of a substance being that quantity of the substance which contains the same number of molecules of the substance as there are carbon atoms in 12 g of pure $^{12}$C.

As used herein, the term "percent (%)" means parts per 100 and the term "parts" means parts by weight unless otherwise defined where used.

As used herein the term "g" means gram or grams.

As used herein the term "ml" means milliliter or milliliters.

As used herein the term "meg" means milliequivalent.

As used herein the term "Torr." means millimeters of mercury absolute pressure. Thus, atmospheric pressure is 760 Torr.

As used herein the term "non-protonic" (as applied to a "liquid non-protonic carbonyl solvent") means carbonyl compounds such as aldehydes and ketones which have no readily ionizable protons. Aqueous systems consisting of about 0.01-1 mole of a liquid non-protonic carbonyl solvent per liter of water have pHs between 6 and 8.

We claim:

1. A process for breaking a water-in-oil emulsion or an oil-in-water emulsion comprising subjecting the emulsion to the demulsifying action of a demulsifying composition formed by: (a) preparing a water soluble polyurea having at least 1 amino group per molecule by admixing and reacting in a liquid ketone or aldehyde having at least 2 carbon atoms per molecule; (i) a polyisocyanate; and (ii) a polyamine having at least 3 amino nitrogen atoms per molecule with at least 2 of the amino nitrogens being bonded to hydrogen atoms; and (b) forming a water soluble quaternary ammonium polymer by reacting said water soluble polyurea with an alkylating agent, and separating the resulting oil and water phases of the broken aqueous emulsion, the demulsifying composition being present in an amount effective for breaking the aqueous emulsion.

2. The process of claim 1 in which the ketone is acetone or methyl ethyl ketone.

3. The process of claim 1 in which the polyamine and the liquid ketone or aldehyde are admixed and allowed to stand for 2 minutes to 24 hours at −5° C to +150° C before the polyamine and the polyisocyanate are admixed.

4. The process of claim 1 in which the polyisocyanate and the polyamine are admixed in amounts to provide 1–20 amine groups per isocyanate group.

5. The process of claim 1 in which the polyamine and the polyisocyanate are reacted at 0°–100° C.

6. The process of claim 1 in which the alkylating agent is an alkyl sulfate having 2–10 carbon atoms.

7. The process of claim 1 in which the alkylating agent is dimethyl sulfate, diethyl sulfate, or methyl chloride.

8. The process of claim 1 in which the water soluble polyurea and the alkylating agent are reacted in an aqueous medium.

9. The process of claim 1 in which the water soluble polyurea is separated from the liquid ketone or aldehyde before reacting said water soluble polyurea with the alkylating agent to form said water soluble quaternary ammonium polymer.

10. The process of claim 1 in which the polyamine and the ketone or aldehyde are combined and admixed before the polyisocyanate is admixed therewith.

11. The process of claim 1 in which:
a. the polyamine and the ketone or aldehyde are combined and admixed in a mole ratio of 1:1–100 to form a first mixture;
b. the polyisocyanate and the ketone or aldehyde are combined and admixed in a mole ratio of 1:10–1,000 to form a second mixture; and
c. the first mixture and the second mixture are combined.

12. The process of claim 1 in which the aqueous emulsion is a water-in-oil emulsion.

13. The process of claim 1 in which the aqueous emulsion is an oil-in-water emulsion.

14. The process of claim 1 in which the oil component of the emulsion is a petroleum oil.

15. The process of claim 1 in which the petroleum oil is crude oil.

16. The process of claim 1 in which the aqueous component of the emulsion is a brine.

17. The process of claim 1 in which the brine is a naturally occuring brine.

18. A process for breaking a water-in-oil emulsion or an oil-in-water emulsion comprising subjecting the emulsion to the demulsifying action of a water soluble alkylated polyurea of a polyamine having at least 3 amino moieties per molecule, with at least 2 of the amino moieties being selected from the group consisting of primary and secondary amino moieties, and a polyisocyanate, the mole ratio of isocyanate moiety to primary and secondary amino moieties being 1:1–20, and separating the resulting oil and water phases of the broken aqueous emulsion, said water soluble alkylated polyurea being present in an amount effective for breaking the emulsion.

19. The process of claim 18 in which the aqueous emulsion is a water-in-oil emulsion.

20. The process of claim 18 in which the aqueous emulsion is an oil-in-water emulsion.

21. The process of claim 18 in which the oil component of the emulsion is a petroleum oil.

22. The process of claim 18 in which the petroleum oil is crude oil.

23. The process of claim 18 in which the aqueous component of the emulsion is a brine.

24. The process of claim 18 in which the brine is a naturally occuring brine.

* * * * *